United States Patent [19]

Malthouse

[11] 4,447,280
[45] May 8, 1984

[54] LABELLING MACHINE

[76] Inventor: Martin D. Malthouse, 204 Glen Rd., Toronto, Ontario, Canada

[21] Appl. No.: 313,850

[22] Filed: Oct. 22, 1981

[51] Int. Cl.³ ............................................. B29C 27/20
[52] U.S. Cl. ...................................... 156/85; 156/86; 156/499; 156/521; 156/556; 156/567; 156/568; 264/230; 264/342 R
[58] Field of Search .................... 156/85, 86, 521, 556, 156/566, 567, 568, 499; 264/230, 342 R; 215/1 C, 12 A

[56] References Cited

U.S. PATENT DOCUMENTS

| 3,367,822 | 2/1968 | Hoffler | 156/567 |
| 3,523,052 | 8/1970 | Bolen | 156/499 |
| 3,567,551 | 3/1971 | Dullinger | 156/556 |
| 3,604,584 | 9/1971 | Shank | 215/12 R |
| 3,834,963 | 9/1974 | Hoffman | 156/521 |

FOREIGN PATENT DOCUMENTS

| 245261 | 1/1926 | United Kingdom . |
| 262975 | 1/1926 | United Kingdom . |
| 281772 | 12/1927 | United Kingdom . |
| 461764 | 10/1935 | United Kingdom . |
| 659184 | 2/1950 | United Kingdom . |
| 988996 | 9/1963 | United Kingdom . |
| 1106653 | 10/1965 | United Kingdom . |
| 1195787 | 10/1968 | United Kingdom . |
| 1331051 | 9/1969 | United Kingdom . |
| 1453540 | 7/1974 | United Kingdom . |
| 1548429 | 6/1976 | United Kingdom . |
| 1567580 | 5/1980 | United Kingdom . |
| 2052437 | 1/1981 | United Kingdom . |
| 2065535 | 7/1981 | United Kingdom . |

Primary Examiner—Caleb Weston
Attorney, Agent, or Firm—Hirons, Rogers & Scott

[57] ABSTRACT

Labelling equipment is provided for applying heat shrinkable wrap-around labels to contoured surfaces of containers. The equipment includes a label carrier having a wheel rotatable about its axis, a vacuum system coupled to the wheel to retain labels on the wheel, a feeder for directing containers individually to the wheel adjacent the periphery of the wheel to receive a label, and a drive system for receiving containers from the bottle feeder and for rolling the containers upon receiving the label from the label carrier.

The container is supported on a platten having a diameter corresponding to the greatest diameter of the container so that the label depends in a skirt from the container. The container is subsequently transferred to a smaller platten and passed over a heated plenum to shrink the skirt to the contours of the container.

9 Claims, 10 Drawing Figures

LABELLING MACHINE

This invention relates to labelling equipment for applying labels to portions of containers such as bottles and more particularly to equipment for applying labels that wrap around the outer surface of the container and may be heat shrunk to the contours of the container.

It is well known to utilize mechanical handling equipment to apply labels to a container or the like. Such equipment usually includes a drum upon which the label is secured and which moves the label into engagement with the outer surface of the container. The label adheres to the container and is subsequently wrapped around the container by rolling it along a fixed surface.

In order to improve the efficiency of such machines it has been proposed to derive the rolling motion of the container from the rotation of the drum. The container is located between a stationary surface and the drum so that continued rotation of the drum will roll the container along the stationary surface. Whilst this arrangement simplifies the machine it has been found unsatisfactory in the handling of large labels.

In order to increase the capacity of the machine it has been proposed to mount the containers on a large wheel which rotates in synchronism with the label carrying drum. As each container passes the drum it is rotated on its own axis partially to wrap the label onto the container. Whilst this arrangement offers certain benefits in terms of machine capacity compared with prior art machines, it requires each container to be mounted on the wheel so as to be rotatable about its own axis. This necessarily complicates the machine and increases its cost. Further it does not overcome the problems of applying large labels to containers.

In our co-pending application, Ser. No. 098,085, filed Sept. 28, 1979, now U.S. Pat. No. 4,323,416, there is also disclosed a labelling machine including a label carrier having a plurality of support portions each operable to receive and retain a label and move the label along a predetermined path at a predetermined speed, a container feeder operable to direct containers to a position adjacent the predetermined path, and a drive system including transfer means to bring a portion of the label into contact with the container and drive means to rotate the container at a peripheral speed greater than the predetermined speed whereby upon contact of the label with the container, the label is drawn under tension from the support portion and onto the container.

It has been found that by inducing rotation of the container at a speed greater than the peripheral speed of the drum, the label is drawn off the drum under tension. This prevents bucking of the label and enables large labels to be applied to containers. It is preferred to induce rotation of the container by means of a belt entrained around the drum, but moving at a greater speed than the drum. The belt leaves the drum at a location to engage a container and carries the label with it. Thus the container, belt and label are moving at a speed greater than the periphery of the drum to pull the label under tension from the drum. This drive arrangement avoids the need for separate rotatable pads for each container and thereby results in reduced cost, simplification and increased versitility for the machine.

The general improvement in labelling machines has resulted in increased use of rolls of labels which are individually severed as they are placed on the drum. The use of such rolls has avoided the problems associated with feeding individual precut labels from a batch, but some difficulty has been encountered in severing labels from the roll. Flying knife shears have been utilized, but these require accurate adjustment to prevent rapid wear of the cutting edge whilst ensuring the label is completely cut.

In our Canadian patent 951,685 there is disclosed a knife arrangement in which a stationary knife is inclined to the axis of rotation of a rotating knife to achieve a progressive cut across the width of the label. This arrangement has been successful in achieving complete cutting of the label without premature wear of the cutting edge. With this arrangement the label is engaged by a drum prior to severing and a tension induced in the label by rotating the drum at a greater peripheral speed than the feed rate of the label roll. It has now been found that the induced tension may cause the label to be torn from the roll as the knife approaches the end of its cutting action. This is due to the progressive reduction in width of unsevered paper which must resist the tension applied to the label. The tearing of the label is undesirable because of its appearance and because of the misregistration of the label on the drum.

In our prior application, there is also disclosed for use in a labelling machine having a feed mechanism to feed a strip of labels along a predetermined label path and into engagement with a label carrier, a cutter assembly located in the path for severing labels from the strip, a cutter assembly comprising a fixed support, a first cutting element attached to the fixed support to extend transverse to the strip, a rotatable knife carrier mounted for rotation about a first axis, a second knife element attached to the rotatable knife carrier for movement therewith, drive means to rotate the rotatable knife carrier about the first axis and move the second knife element past the first knife element to produce a cutting action, the knife elements diverging in the direction of travel of the second knife element to provide progressive severing of the strip in a direction transverse to the strip, and cam means associated with the rotatable knife carrier and moveable into the path to engage the strip and during a latter part of the cutting action out of the path to disengage the strip whereby tension is removed from strip between the cutter assembly and the label carrier during the latter part of the cutting action.

In the preferred embodiment of this prior application a cam portion is mounted on a rotating knife holder to engage the label being severed from the roll. The cam portion is positioned ahead of the knife blade and moves out of engagement with the label as the knife blade approaches the end of its cut. The label is then slack as the cut is completed to avoid tearing of the label.

Increasing use is being made of wrappers which cover a major area of a container. These wrappers are made from heat shrinkable material so that they may be printed in planar form and subsequently shrunk to the shape of the container by the application of heat. One machine available for applying these wrappers forms a sleeve around a mandrel and then slides the sleeve over the container prior to the application of heat. Such a machine requires the sleeve and container to be moved in a number of directions to bring them into register and consequently has a comparatively low throughput. A further disadvantage is that the sleeve must be of greater diameter than the container for assembly and therefore heat must be applied to the whole container to shrink the sleeve to the container.

It has now been realized that the label application and cutter assembly described in our co-pending application possesses particular utility in the handling of wrappers since control of the wrapper is maintained at all times.

It is therefore one object of the present invention to provide labelling equipment which obviates or mitigates the above disadvantage.

According to one aspect of the present invention, there is provided a labelling machine for applying heat shrinkable labels to a container, said machine comprising a label feeder, a label applicator to receive labels from said feeder and apply a leading edge of said label to said container, drive means to move said container past said applicator and draw the label onto the container to form a cylindrical sleeve, a heat chamber and a conveyor to move least a portion of the container through the heat chamber and cause said label to shrink and conform to the container.

As the label is tightly wrapped to the body of the container, only a portion of the container requires heating.

An embodiment of the invention will now be described by way of example only with reference to the accompanying drawings in which.

The drawings illustrate labelling equipment capable of handling a strip of labels supplied on a spool, severing these labels individually, handling the labels and then applying them to bottles which are controlled and fed through the labelling equipment. Although the equipment is capable of use with various sizes of bottles, it is particularly designed for large bottles or other containers having cylindrical portions for receiving wrap-around labels, and a tapered portion adjacent the base. These labels tend to be unwieldy and therefore difficult to handle. Also, because of the length of the labels they tend to buckle or apply unevenly with unacceptable results. The present equipment controls the labels and applies them to the bottles while maintaining some tension in the labels. As a result the labels are applied evenly and positively to the bottles or containers. This control facilitates the application of labels that wrap the bottle completely to provide coverage of the major portion of the bottle and also permit handling of heat shrinkable film material.

Figure 1:
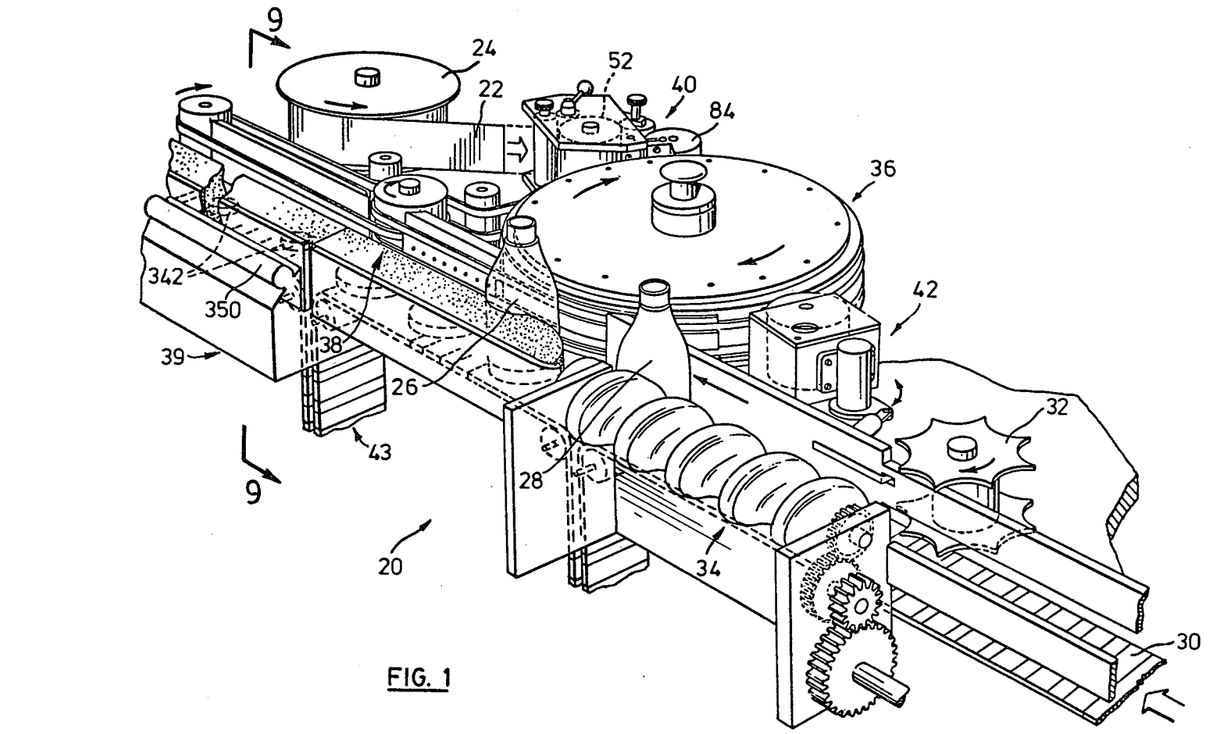
FIG. 1 is a perspective view of a preferred embodiment of labelling equipment looking generally from an end of the equipment from which bottles are fed to receive labels or wrappers.

Reference is now made to FIG. 1 which illustrates a preferred embodiment of labelling equipment 20 for use in applying wrap-around labels to large plastic bottles which are tapered at their lower end. Labels in the form of a strip or web 22 are fed from a spool 24 to meet individually with bottles 26, 28 which are initially fed to the equipment by a conveyor 30. The bottles meet a separator 32 which allows them to be moved individually by a bottle feeder 34 to a point where each bottle receives a label from a label carrier 36. At this point, each of the bottles is supported on a rotatable platten 37 to allow the label to extend below the bottle in a skirt. The platten 37 is part of a conveyor 41 described in detail below. The bottle is then controlled by a bottle drive system 38 which rolls the bottle to receive the label and then transfers the bottle to a conveyor 43 over a heat chamber 39 to shrink the label onto the tapered portion of the bottle.

The strip 22 of labels is drawn by a label feeder assembly 40 which also includes a cutting head as will be described later. As the labels leave the feeder assembly 40 they are attached individually to the label carrier using a pneumatic vacuum system in the carrier 36. The labels then pass a glue applicator assembly 42 before being applied to bottles.

Figures 2, 3:
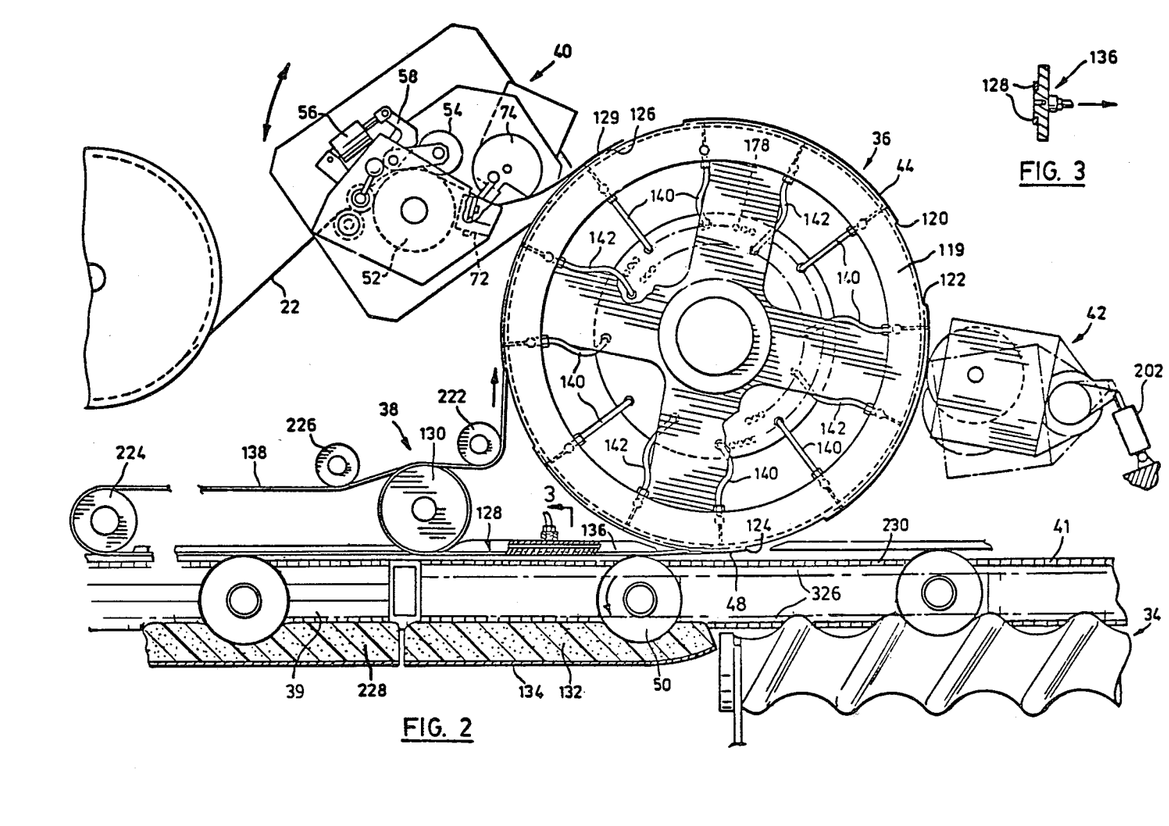
FIG. 2 is a plan view having portions sectioned to show details of the labelling equipment.
FIG. 3 is a sectional view on line 3—3 of FIG. 2 showing a portion of the equipment.

The general arrangement can also be seen in FIG. 2. In this view an end of the strip 22 has been captured by label carrier 36, and preceding labels 44, 46 are attached to the carrier under the influence of the vacuum system as will be described. A label 48 precedes label 46 and has almost completely separated from the carrier 36 in the course of application onto a bottle 50. Details of FIG. 2 will be described more fully in combination with subsequent views but at this point it is important to note that the peripheral speed of the portion of the label carrier 36 which receives the labels is slightly greater than the linear speed of the strip 22 to maintain some tension in the label as it transfers from the label feeder assembly 40 to the label carrier 36. Similarly, the bottle drive system 38 is arranged to move the periphery of the bottle slightly faster than the label is moving with the carrier 36. This again ensures tension in the label as it is transferred from the carrier 36 to the bottle 26.

For the sake of convenience the label feeder assembly 40 will be described in detail before then describing the label carrier 36 and bottle drive system 38. Other parts of the equipment will be described where they relate to the feeder assembly, label carrier, and drive system.

Figure 4:
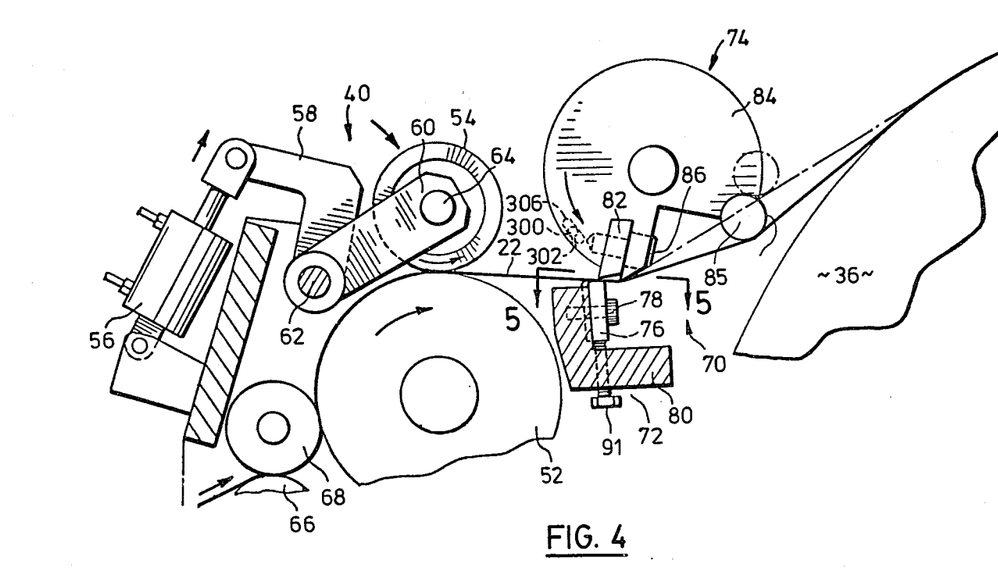
FIG. 4 is a further plan view showing a part of a label feeder assembly to a larger scale than that used in FIG. 2.
Figure 6:
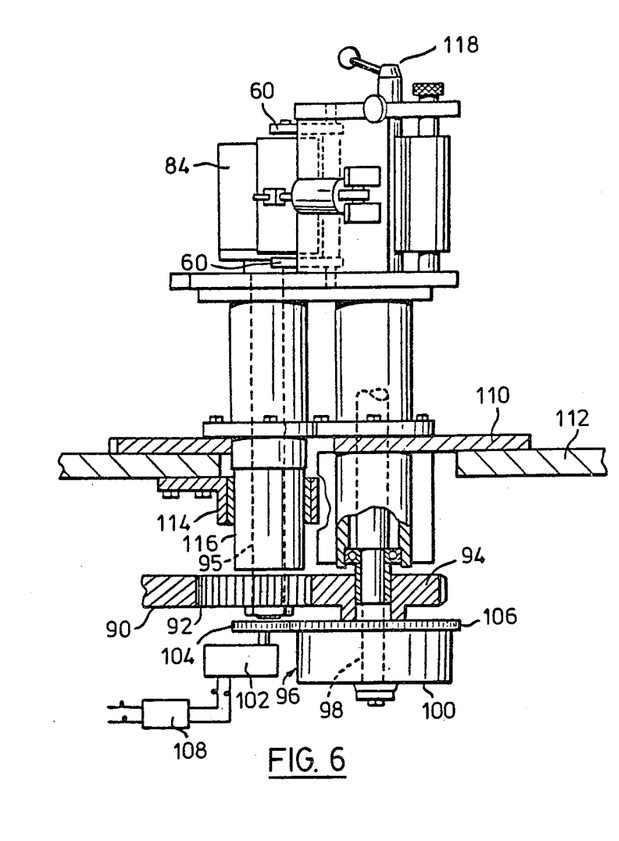
FIG. 6 is a side view of the label feeder assembly showing some parts in section.

Reference is next made to FIGS. 2, 4 and 6 with particular reference initially to FIG. 4 to describe the main components of the label feeder assembly 40. The strip 22 of labels is drawn into the label feeder assembly by a main or drive roll 52 combining with a rubber pinch roll 54 which is biased towards the main roll 52 by a pneumatic actuator 56 operating on the end of an L-shaped arm 58 which is in fixed relation with a pair of arms 60 and which pivots about an upright spindle 62. The arms 60 support a further spindle 64 about which the roll 54 is free to rotate. Consequently upon energizing the actuator 56 the pinch roll 54 is biased into engagement with the main roll 52 resulting in a driving force to progress the strip 22 through the assembly. The strip is also guided by idlers 66, 68 which both tend to remove any natural curl from the labels and also ensures that the strip is in good contact with the main roll 52 before the strip meets the pinch roll 54. The strip passes from the main roll 52 through a cutter assembly 70 and into engagement with the periphery of the carrier 36 where it is held by vacuum pads as will be described below. Because of the greater peripheral speed of the carrier 36, the strip slips relative to the carrier so that it is under tension. As seen in FIG. 4, the strip is moved from the main roll 52 into a position for severing into individual labels by a cutter assembly 70. This assembly consists of a stationary portion 72 and a rotating cutter head 74. The stationary portion 72 includes a blade 76 attached by screws 78 to a fixed bracket 80. The blade 76 can be aligned with a further blade 82 in a notched roll 84 using adjusting screws 86 before tightening screws 78 completely. The blade 82 is held in the notched roll 84 by screws 86.

Figure 5:
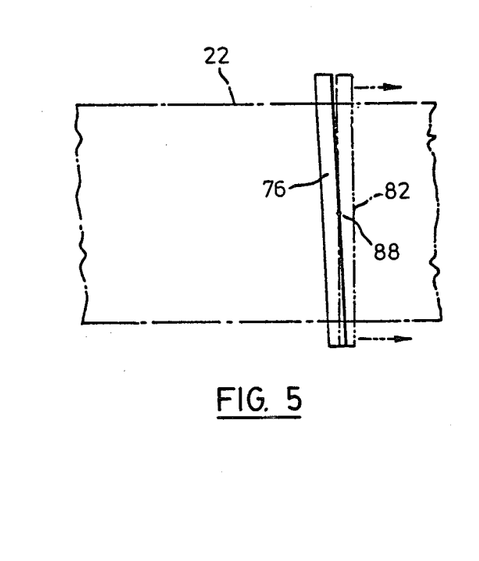
FIG. 5 is a view on line 5—5 of FIG. 4 to illustrate the operation of cutting blades used to sever individual labels from a strip of labels.

The arrangement of the blades 76 and 82 is such that the strip is cut progressively across the width of the strip as indicated in FIG. 5. Here it will be seen that the blade 76 is inclined to a vertical axis whereas the blade 82 is vertical. As shown, the strip is being cut at a point 88 and has already been cut up to that point running from the bottom to the top of the strip 22.

It has been found that the arrangement of blade 76 relative to blade 82 results in an improved cut because of the scissor action as the blades come together while the strip is moving past the blades.

The inclination of the blade to the vertical axis ensures a square edge is cut as the label passes through the cutter assembly 70 so that it is not necessary to interrupt movement of the label whilst it is being cut.

It will also be noted that the trailing edge of the blade 82 cooperates with blade 76 to perform the cutting action. In practice it has been found that a slight interference between the cutting edges is possible without detrimental wear of the cutting edges. The interference is achieved by locating the blade 76 within the path of the blade 82 by adjustment of an adjusting screw 91.

A cam lobe 85 is attached to the notched roll 84 in advance of the blade 82. The cam lobe 85 is positioned so that its peripheral surface 87 engages the strip 22 as it moves past the stationary blade 76. As may best be seen in FIG. 4, the strip 22 is deflected in its path so that the effective distance between the stationary blade 76 and the point of engagement of the strip with the carrier 36 is increased. Since the strip is firmly held by pinch wheel 54 and main roll 52, the strip will slide relative to the periphery of the carrier 36.

As the notched roll 84 continues to rotate, as indicated in chain dot lines in FIG. 4, the cam lobe 85 moves out of the path of the strip 22 so that there is a temporary slack in the strip 22. The cam lobe 85 is positioned so as to disengage the strip 22 as the blades 76, 82 complete the cut. Since the tension is momentarily released from the strip, the tendency to tear the label from the strip is reduced.

It will be apparent that the path of the strip may be modified so that the cam engages the strip over a reduced arc provided that sufficient slack is created in the label to permit the cut to be completed before the difference in speed between the carrier 36 and the main roll 52 again introduces tension in the label.

Figure 8:
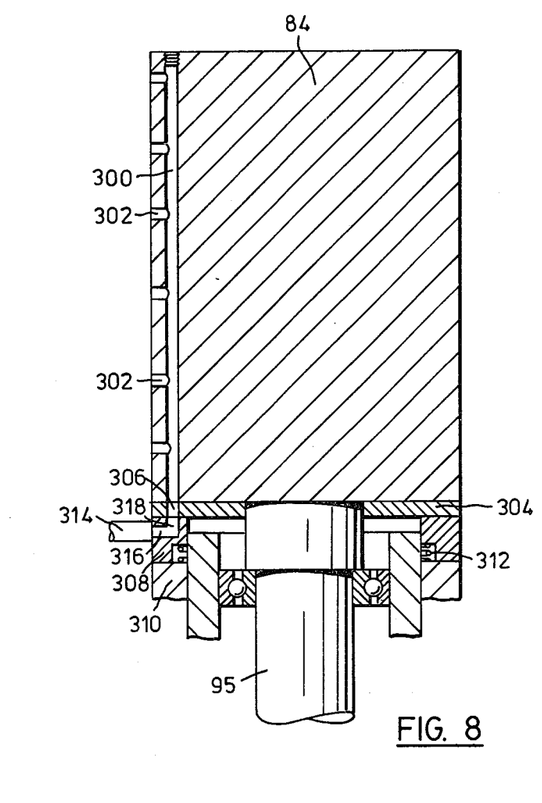
FIG. 8 is a section on the line 8—8 of FIG. 4.

When using unsupported film of heat shrinkable material, such as that sold under the trade name Cellulambl by Cellucraft Inc. there may be a tendency for the film to stick to the rotating cutter 82. As can be seen in FIGS. 4 and 8, the roll 84 includes an axial passage 300 which is intersected by a number of radial passages 302 extending to the periphery of the notched roll 84. A wear disc 304 is attached to the under surface of the notched roll 84 and includes an arcuate aperture 306 in register with the passage 300. A manifold plate 308 is attached to an upper surface of a stand 310 that supports a drive shaft 95 of the notched roll 84 and is biased into engagement with the wear disc 304 by spring 312.

A supply line 314 is connected to a port 316 in the mainfold plate 308 to supply air to an outlet 318 in the upper surface 320 of the mainfold plate 308. The outlet 318 is located at the same radial spacing as the aperture 306 so that during a portion of each rotation of the cutter assembly, air is supplied to the axial passage 300 and radial passages 302.

The radial passages 302 are located behind the knife 82 and the outlet port 318 adjusted so that air is admitted to the passage just as the strip 22 is cut. The radial passages 302 direct the air against the uncut portion of the strip 22 to push it away from the blade 82 and onto the drum 36.

The passages 302 are not truly radial but do in fact direct air from the roll 84 at an angle in advance of the radial line. This forward inclination assists in feeding film past the knife.

The period of the air blast may be adjusted by varying the length of the aperture 306 and the timing of the air blast may be adjusted by rotation of the manifold plate 308.

Turning now to FIG. 6, it will be seen that the parts described with reference to FIG. 4 are driven from a single input spur gear 90 (part of which is shown). The gear meshes with a second gear 92 which is in turn in mesh with a further gear 94. The gear 92 is attached to the lower end of a shaft 95 to drive the notched roll 84. Similarly, the gear 94 is attached to the planetary portion of an epicyclic gear box 96 to drive the sun gear which is attached to the lower end of a shaft 98 associated with the main roll 52 (FIG. 4). (For simplicity, the planetary gears and sun gear have been omitted from the drawing.) The epicyclic gear box 96 includes a housing 100 which for the moment can be considered to be stationary. As a result, drive from the intermediate gear 92 results in rotation of the shaft 98 which is attached to the main roll 52 (FIG. 4) to drive the strip 22.

The epicyclic gear box 96 permits differential movement between the shafts 95 and 98. If the housing 100 is stationary, then the shaft 98 will rotate at a speed dictated by the relationship between the planet and sun gears in the epicyclic gear box. However it is possible to either advance or retard the shaft 98 relative to the shaft 95 by turning the housing 100 about the axis of shaft 98. This is necessary because of the allowance in length of each label. If it is found that the labels are being cut either in advance or behind the desired cutting line, then adjustment can be made through a motor and gear box 102 which drives a pinion 104 in mesh with a ring gear 106 associated with housing 100. The motor and gear box is reversible and is driven via a control circuit 108 which receives a signal from a device which senses the location of a label to determine whether or not the cutter should be advanced or retarded in relation to the labels. The device senses a predetermined marking on the labels and produces a signal to move the motor and gear box in an appropriate direction to ensure the cutter engages the label at the required position. The structure shown in FIG. 6 has a particular advantage from the standpoint of adjustment and maintenance. It will be seen that the structure includes a plate 110 resting on a part 112 of the frame of the equipment. The structure is located relative to the part 112 by a bearing housing 114 attached to the part 112 and containing a cylindrical portion 116 of the structure. The plate 110 can slide on the part 112 and rotate about the axis of shaft 95 so that the assembly shown in FIG. 6 can be swung about this axis and into a position for more convenient adjustment and maintenance. This is also made possible by the fact that such movement takes place about the axis of the shaft 95 so that the engagement of the gears 92, 94 is not affected.

The assembly shown in FIG. 6 can be locked in position using a simple engagement fitting controlled by a handle 118 and with the structure locked in position by this handle it assumes the position shown in FIGS. 1 and 2. Such movement is particularly useful for adjusting the blade 76 (FIG. 4) of the stationary portion 72 of the cutter assembly 70. It will be appreciated that the spur gear 90 shown in FIG. 6 is driven through a suitable drive chain from a bull gear 121 shown at the bottom of FIG. 7. It will become apparent that this ensures that the label carrier 36 shown in FIG. 1 is driven synchronously with the notched roll 84. The reason for this will become evident from subsequent description.

Returning to FIG. 2, the label carrier 36 consists essentially of a large wheel having a discontinuous periphery. Four raised peripheral pads 120, 122, 124 and 126 are provided spaced equally about the periphery of the wheel. As will be described with reference to FIG. 7, these pads are provided with openings connected to a vacuum system to hold labels such as labels 44 and 46 on the pads.

FIG. 2 shows a label 129 which is projecting outside the label feeder assembly 40, but has yet to be severed from the strip 22. It will be seen that the leading edge of the label projects beyond the leading end of the pad 126 whereas the label 44 which has been severed from the strip sits on the pad and does not overhang the pad. This is because the wheel is made to move with sufficient peripheral speed that it creates slippage between the pad 126 and the label 129. Because the vacuum system maintains the label in contact with the pad, a tension exists in the label and this ensures that the label is drawn into firm engagement with the pad. When the label is severed from the strip, it will have slipped on the wheel to a point where the leading end of the label lies immediately adjacent the leading end of the pad 126. As soon as the label is severed it will be drawn onto the pad and take up a position such as that shown for label 44. This process continues as the severed label progresses with the wheel past the glue applicator assembly 42. Here glue is applied in a conventional manner, the applicator assembly being controlled to move out of engagement with the wheel should there be no label on the pad. This control will be described subsequently.

Figure 1A:
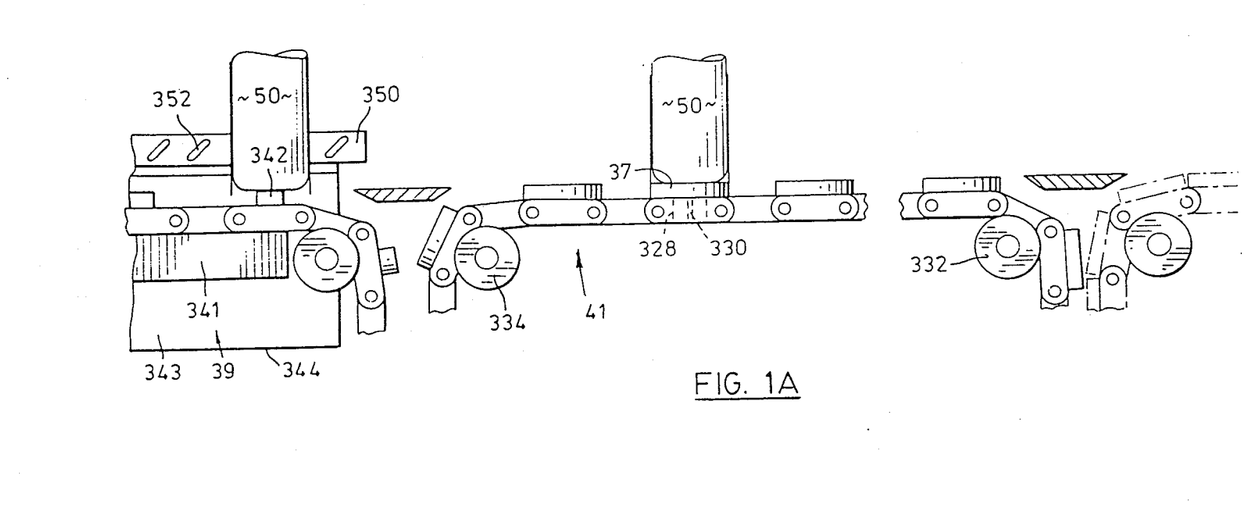
FIG. 1a is an elevation of the equipment shown in FIG. 1.
Figure 7:
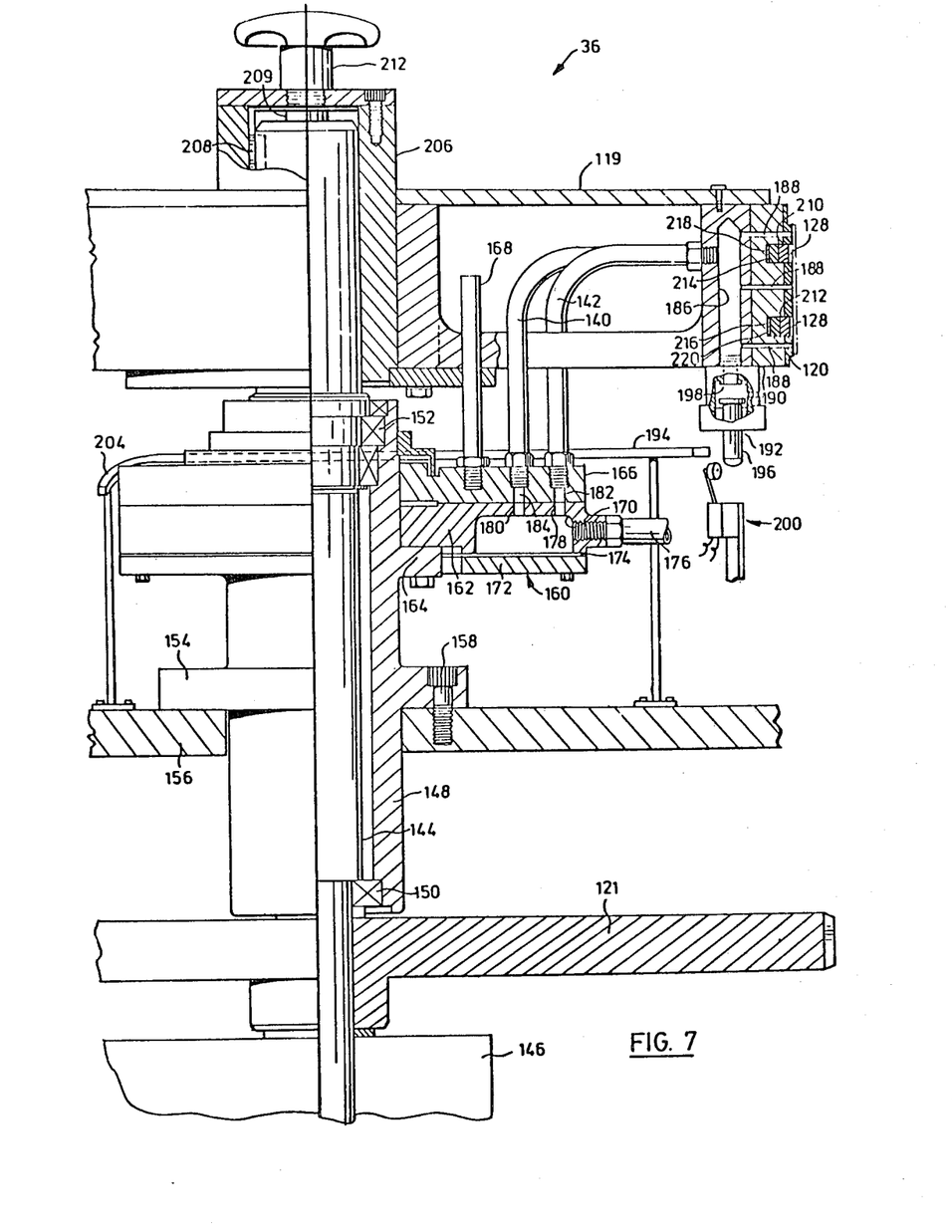
FIG. 7 is a compound view of a label carrier which receives labels from the label feeder assembly, the right half being in section and the left half being generally an elevation

After a label such as label 46 has passed the applicator assembly 42 a leading end is stripped off the wheel by a pair of belts 128 (one of which is seen in FIG. 2 and both of which can be seen in FIG. 7). These belts pass around the wheel 119 driven by a roll 130 which causes a linear velocity in the belts greater than the peripheral velocity of the wheel 119. Bottle feeder 34 is driven also from the bull gear 121 (FIG. 7) to cause bottles to be in position to receive labels from the wheel 119. The bull gear 121 also drives the conveyors 41 and 43 so that the plattens 37, 342 are in synchronism with the bottles transferred by the bottle feeder 34. The conveyor 41 can best be seen in FIG. 1a and includes a pair of endless linked chanins 326 interconnected by lateral webs 328. The plattens 37 are rotatably mounted on spindles 330 and are of sufficient height to allow a skirt formed by the label to depend from the bottle. The diameter of the plattens 37 is chosen to correspond to the largest diameter of the bottle to which the label is applied. The periphery of the platten therefore provides a support for the lower edge of the label enabling the seam in the label to be pressed down as it is rolled. In the event that the skirt does not extend fully to the base of the bottle, the platten 37 may be formed with an upstanding edge so as to provide the desired support for the label. The chains 326 are entrained around a drive gear 332 driven by the bull gear 121 an idler 334. As the bottles are fed by the separator 32 into the bottle feeder 34; the platten 37 engages the underside of the bottle and moves in synchronism toward the drum 36 and into position to receive the label. The bottle 50 for instance has reached a reaction pad 132 supported by a wall 134 and is biased into contact with the belt 128 so that the bottle is driven linearly along the conveyor 30 at half the speed of the belt. The belt guides the leading edge of the label into contact with the outer surface of the bottle 50 which is moving faster than the label, so that as soon as the adhesive on the label comes into contact with the bottle, the label begins to adhere to the bottle and is pulled off the wheel while maintaining sliding engagement with the associated one of the raised pads on the wheel. This tension ensures an even and controlled application of the label as the bottle rolls in contact with the pad 132. An auxiliary vacuum pad 136 is provided to further support the label after it has slid off the pad 132 and before it is applied completely to the bottle 50. This will be better understood with reference to FIG. 3 which shows a sectional view through the auxiliary vacuum pad 136. Once the label has been applied, the conveyor 41 passes over the idler 334 to remove the platten 37 from the bottle. The bottle is transferred onto conveyor 43 across a bridge 340 by a further single belt 138, which is also driven by the roll 13. The bottle is engaged by a platten 342 mounted on the conveyor 43 and of significantly smaller diameter than the base of the bottle. The conveyor 43 is supportedalong its length by a rail 341 to provide a stable support for the bottle 28. The surface of reaction pad 132 is provided with inclined ribs which cooperate with the bottle surface to force it down onto the conveyor 43. As the bottle is advanced by the conveyor 43, it passes over the heat chamber 39 where the heat causes the label to shrink and conform to the shape of the bottle with the skirt shrinking onto the lower surface of the bottle. Typically, the temperature required to shrink the material is as low as possible and dependant upon a variety film materials, but in the range of 100°–250° F. The cooperation of the belt 138 and reaction pad 132 causes rotation of the bottle to ensure the skirt is uniformily heated. Thereafter the bottle passes onto a conventional conveyor.

Figure 9:
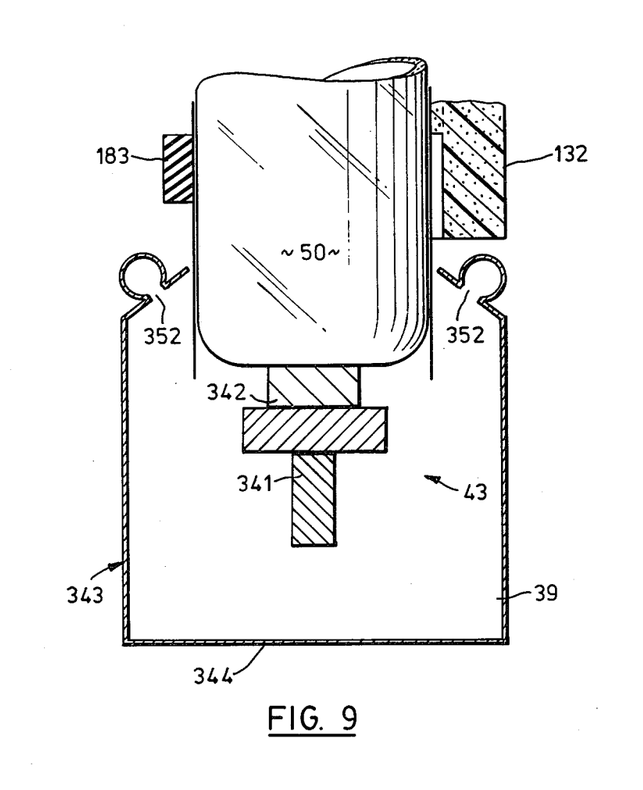
FIG. 9 is a view on the line 9—9 of FIG. 1.

Details of the heat chamber 39 can best be seen in FIG. 9. The chamber 39 comprises a duct 343 along which the conveyor 43 passes. The duct includes a base 344 and a pair of side walls 346 each having an inclined lip 348. A manifold 350 is mounted on each of the lips 348 and delivers hot air from a heat source and blower (not shown) to the interior of the duct through a series of nozzles 352. The nozzles 352 are spaced along the length of the duct 343 and directed to the base 344. The nozzles 352 are formed from slits in the manifold inclined at 45° to the longitudinal axis of the manifold. This provides an air knife that sweeps across the skirt from top to bottom as the bottle passes along the heat chamber 39.

Air from the interior of the duct is removed from each end and recirculated through the heater and blowers. The air discharged from the nozzles 352 impinges on the skirt depending from the bottle 50 and causes the label material to shrink to conform to the shape of the bottle.

It will be observed that only the lower portion of the bottle is subjected to heat minimising the hot air required and the risk of damage to the bottle. It will also be appreciated that the label can be shaped to the neck of the bottle in a similar manner by arranging a heat chamber at the appropriate level along the length of the conveyor 43.

Returning now to the details of construction of the label carrier 36, it is evident from FIG. 2 that the wheel 119 includes two groups of vacuum pipes, an outer group 140 and an inner group 142. It will be seen that the outer pipes 140 serve the ends of the labels whereas the inner pipes 142 serve the centres of the labels. With this arrangement it is possible to release or more positively secure the centre of the label independently of the ends and vice versa.

Reference is next made to FIG. 7 to describe the structure of the label carrier 36. The carrier rotates about an axis defined by a vertical shaft 144 driven from a main drive and gear box 146. The bull gear 121 is attached to the shaft 144 and drives all of the other parts of the equipment through a conventional drive chain.

The shaft 144 passes through a bearing housing 148 and is supported at ends of the housing by suitable bearings 150, 152 which include a thrust bearing. The bearing housing 148 includes a flange 154 sitting on a part 156 of the frame of the equipment and attached by suitable bolts 158.

The bearing housing 148 also supports a vacuum distributor 160 having a lower part 162 fixed to the bearing housing by a further flange 164 and an upper or movable portion 166 which rotates with the wheel 119 driven by a pin 168 as will be described. The portions 162 and 166 are machined to define smooth faces in engagement with one another to facilitate the upper portion riding on the lower portion as the upper portion rotates.

The lower portion 162 defines an annular recess 170 covered by a plate 172 and seal 174. These parts combine to define an annular manifold served by a vacuum connection 176. This manifold then serves the pipes 140, 142 by way of concentric rows of openings 178, 180 in the fixed part 162 and corresponding openings 182, 184 associated with the pipes 140, 142. The openings 178, 180 extend partially about the part 162 as illustrated in broken outline in FIG. 2. Consequently, as the wheel 119 rotates the openings 182, 184 are affected by vacuum when they coincide with openings 178, 180. It will be evident that the size of openings 178, 180 can be varied to provide different degrees of vacuum in the pipes 140, 142 as the wheel 119 rotates.

Each of the pipes 140, 142 terminates at its upper extremity in a fitting which connects the pipe to one of a series of upright bores 186. Each of these bores acts as a manifold to a series of radial openings 188 for drawing air from the front of one of the raised pads such as pad 120. A label is shown in ghost outline fixed to such a pad. In fact, these pads are preferably of an elastomeric material bonded to an outer ring 190 which is made up of two halves and attached to the main body of the wheel.

Each of the bores 186 is associated with the pipes 140 at the leading end of a label has a vacuum sensor 192 at its lower end. This sensor normally rides on a track 194 until it passes a point at which a label should be picked up. In the event that a label is picked up there will be a build up of negative pressure in the bore 186 which will retain a loose plunger 196 against a seat 198 to thereby seal the bore 186. The plunger 196 will then be in a raised position and as the wheel 119 rotates the plunger will pass above an electrical switch 200. However, in the event that a label is not supplied to the wheel for some reason there will be insufficient vacuum built up in the bore 186 to maintain the plunger in its upper position and it will then drop off the end of the track into the position shown in FIG. 7. As the wheel rotates the plunger will contact the switch 200 and this switch will be used to energize an actuator 202 (FIG. 2) associated with the glue applicator assembly 42. Energizing this actuator results in moving the applicator assembly away from the wheel to avoid applying glue to the wheel in the absence of a label.

After the plunger 196 has met the switch 200, it will continue in the dropped or lower position until it reaches an incline 204 at a leading end of the track 194 which raises the plunger back to a position in which it engages seat 198.

The wheel 119 includes a central boss 206 which locates on an upper extremity of the shaft 144 and is engaged on the shaft by a key 208. An extension 209 on the upper extremity of the shaft is threaded to receive a knob 212 which retains the wheel on the shaft. It will be evident that once the knob is removed it is possible to disconnect the pipes 140, 142 and to lift the wheel off the equipment. Once this is done the distributor can be removed so that it is quite simple to service the equipment and to change parts if this is necessary for different labels.

Returning to the operation of the equipment, in the position shown in FIG. 2, pipe 140 adjacent label 128 is applying vacuum and has picked up the forward end of the label. As the wheel 119 rotates this label remains in contact although it will slide on the wheel until the label is separated from the strip 22. At this point it will have dropped back from label 44 by the amount of the space between pads 126 and 120 and will then effectively take up a position similar to that shown for label 44. Because a label has been attached to the wheel, the sensor 192 (FIG. 7) will fail to touch the switch 200 so that glue will be applied to the label as it continues to move into position for application to a bottle. It should be noted that it is possible with the arrangement of pipes 140, 142 to apply more vacuum at the centre of the label during gluing if required and in fact to vary the vacuum effect on the label by changing the sizes of the holes in the parts of the distributor serving the pipes. As mentioned earlier, the leading end of the label is stripped from the wheel by the belts 128 and at this point vacuum is no longer applied to the leading end of the label. Also, at this point the label becomes attached to a bottle and in order to simplify slippage of the label on the wheel it is preferable to discontinue vacuum through the pipe 142 to the centre of the label and to rely on vacuum on the trailing edge of the label through one of the pipes 140. Thus the holes 180 terminate at a position corresponding to the circumferential position of the conduit 140 just after the leading edge of the label is detached from the suction pad. The initial contact between the label and the bottle takes place just where the belt leaves the wheel and the differential speed between the belt and the wheel ensures tension in the label. This differential speed is achieved using a particular arrangement of belt engagement on the wheel 119 as will be described.

Reference is again made to FIG. 7 to describe the parts of the wheel 119 associated with containing the belts 128. These belts sit in respective recesses 210, 212 in radial engagement with slip rings 214, 216 made up in segments and of a low friction plastic material such as polytetrafluoroethylene. In turn, these slip rings are in radial engagement with brass wear strips 218, 220 which are also positioned in the ring 190 at the bottom of the respective recesses 210, 212. As a result of this arrangement the belts 128 can be driven at a linear speed greater than the peripheral speed of the wheel without interfering with the labels before they are ready to be stripped from the wheel. However, as soon as a label is stripped off the wheel and in engagement with a bottle, the speed of the label becomes that of the belt thereby ensuring tension in the label as it is stripped off the wheel.

The belts 128 are driven continuously by roll 130 which in turn is driven from the bull gear 121 (FIG. 7) through suitable drive members. Tension is maintained in the belt by an idler 222 and, as mentioned earlier, the single belt 138 is also driven by the roll 130. This belt passes around an idler 224 and tensioning idler 226 so that the belts 128 and 138 combine to roll the bottles along the reaction pad 132 and subsequent pad 228 with a linear velocity substantially equal to that of the conveyor 30. Guides 230 are shown in ghost outline to support the bottles at the neck and to limit the possibility of the bottles being toppled by engagement with the label etc.

I claim:

1. A labelling machine for applying heat shrinkable labels to a container, said machine comprising a label feeder, a label applicator to receive labels from said feeder and apply a leading edge of said label to said container, drive means to move said container past said applicator and draw the label onto the container to form a cylindrical sleeve, said drive means including a platen to support said container adjacent said applicator such that said label depends from said container and is supported by the periphery of said platen during application of said label, a heat chamber and transfer means to transfer said container from said platen to a conveyor to move at least a portion of the container through the heat chamber and cause said label to shrink and conform to the container.

2. A labelling machine according to claim 1 wherein said conveyor includes a further platen of reduced dimension to support said container in said heat chamber with said label depending freely from said container.

3. A labelling machine according to claim 2 wherein said heat chamber includes a pair of manifolds located on opposite sides of said conveyor and operable to direct hot air onto the depending portion of the label.

4. A labelling machine according to claim 3 wherein said conveyor causes rotation of said container as it passes through said heat chamber.

5. A labelling machine for applying heat shrinkable labels to a container having a generally cylindrical body and a tapered contour at its lower edge, said machine comprising a label feeder, a label applicator to receive labels from said feeder and apply a leading draw said label onto said container to form a cylindrical sleeve around said container with a skirt overlying said tapered portion, said drive means including a platen to support said container and having a periphery engagable with said skirt to provide support therefore, a heat chamber, and a conveyor to move said container from said label applicator through said heat chamber to shrink said skirt of said label to said tapered portion.

6. A labelling machine according to claim 5 wherein said conveyor includes a platten of smaller diameter than said tapered portion to support said container.

7. A labelling machine according to claim 6 wherein said conveyor includes means to rotate said container as it passes through said heat chamber.

8. A method of applying heat shrinkable labels to a container comprising the steps of feeding a leading edge of said label to said container, supporting said container on a platen, rotating said container to draw said label onto said container to form a cylindrical sleeve about said container with the periphery of said platen supporting a skirt depending from the container and removing the container from said platen and passing said container through a heated zone to cause said label to shrink and conform to the contours of said container.

9. A method according to claim 8 including the step of rotating said container as it passes through said heat chamber.

* * * * *